United States Patent [19]

Van Voren et al.

[11] Patent Number: 4,756,814

[45] Date of Patent: Jul. 12, 1988

[54] METHOD FOR THE INDIVIDUAL MARKING OF PRECOOKED ANODES FOR THE ELECTROLYTIC PRODUCTION OF ALUMINUM

[75] Inventors: Claude Van Voren; Christian Jonville, both of St. Jean de Maurienne, France

[73] Assignee: Aluminum Pechiney, Paris, France

[21] Appl. No.: 61,581

[22] Filed: Jun. 15, 1987

[30] Foreign Application Priority Data

Jun. 19, 1986 [FR] France ............... 86 09554

[51] Int. Cl.$^4$ ............................................. C25B 11/12
[52] U.S. Cl. ....................................... 204/294; 204/67; 264/40.1; 264/105; 264/118; 264/119; 373/89; 373/151; 373/88
[58] Field of Search ............... 204/67, 294; 264/40.1, 264/71, 105, 118, 119, 123; 373/54, 88, 89, 151, 92, 91

[56] References Cited

U.S. PATENT DOCUMENTS 3,705,947 10/1971 Persson ................................ 373/91
4,659,442 4/1987 Naterstad et al. ................... 373/92

Primary Examiner—John F. Niebling
Assistant Examiner—Kathryn Rubino
Attorney, Agent, or Firm—Dennison, Meserole, Pollack & Scheiner

[57] ABSTRACT

The invention relates to a method for the individual marking of precooked anodes used in the production of aluminum by electrolysis in the Hall-Heroult process, and to the anodes produced thereby. These anodes are produced by hot compaction of a carbonaceous paste, and according to the invention, during or immediately after such compaction, a plurality of impressions is formed in the upper part of each anode. The impressions are depressions and/or relief portions, constitute a digital coding for the identification number of each anode, and remain legible until withdrawal of the components of the butt of the worn anode from the electrolysis tank. The marking can be carried out using a binary or ternary code, where the reference plane of the zone of the anode which carries the marking corresponds to a first digit, with other digits corresponding to depressions of a particular depth, depressions of a greater depth, or relief portions.

19 Claims, 3 Drawing Sheets

METHOD FOR THE INDIVIDUAL MARKING OF PRECOOKED ANODES FOR THE ELECTROLYTIC PRODUCTION OF ALUMINUM

TECHNICAL FIELD OF THE INVENTION

The present invention relates to a method for the individual marking of precooked anodes for the production of aluminium by electrolysis of alumina dissolved in cryolite melted at 930°/960° C. by the Hall-Heroult method.

At the present time, the vast majority of modern aluminium production plants throughout the entire world employs the so-called "precooked anode" technique.

On the basis of a carbonaceous paste based on tar and coke mixed at 120°/200° C., anodes are moulded generally by vibro-compaction, after which they are cooked for about 100 hours at 1150°/1200° C., after which they are attached by a cast iron seal to a suspension system referred to as an "anode rod" which provides for mechanical support and electrical connection to the anode frame.

It is well known that anodes progressively burn on their underside due to the effect of the oxygen emanating from electrolytic dissociation of the alumina and must therefore be periodically replaced.

Among the various electric and electrochemical parameters which the operator watches and seeks to optimise, the rate of anode combustion (that is to say after all the consumption of carbon per metric tonne of aluminium produced) is one of the most important. Periodic changing of anodes, even automated, remains a tricky operation which can cause upsets in the electrolysis tank, because it produces a localised cooling of the bath, and a localised imbalance in the electrolysis current throughout the entire period during which the temperature of the new anode settles down. The aim, therefore, is to increase as far as possible the effective life of the anodes and likewise to increase their electrical conductivity. For this, the operator can vary numerous parameters: quality of the tar, quality and granulation of the coke, efficacy of the mixing process, efficacy of the shaping by pressure or by vibration or by impact or by a combination of any number of these means, and finally cooking in the furnace.

To arrive at a correlation between the characteristic features of a given anode and the factors which have produced these characteristics, it would be desirable if, by any method whatsoever, the anodes could be watched from the start to the finish of their existence cycle.

STATUS OF THE PRIOR ART

To-date, various attempts have been made to identify anodes. Generally a number has been engraved on them during or after compaction. This number is recessed into the anode and may be a batch number, for example a weekly number, or it may be an individual number representing a quite specific anode.

However, this marking has the major drawback of not permitting automated re-reading during the various stages in the life of the anode. Indeed, apart from the fact that suitable apparatus is only in the development stage, the engraved numbers generally suffer during the anode cooking stage as they undergo surface deformation and possible encrustation with filling material. It then becomes difficult for even an experienced operator to read the number.

Furthermore, marking anodes "by batches" is not satisfactory. Indeed, a modern run of 240 tanks of 16 anodes with an average working life of 24 days, for example, entails a weekly production of more than 1100 anodes and there is every reason to fear that over such a period, the fluctuations and the various factors in the whole of the production cycle will render very significant any differences in the individual behaviour of anodes.

OBJECT OF THE INVENTION

The object of the invention is to provide a method of individually marking anodes which does not upset nor delay the production line, and which remains legible from a "crude" stage until the final treatment of the anode butt in the sealing shop.

This method is characterised in that at the time when the anodes are shaped or immediately following such shaping, there are made in the top part of each anode, in an area which has every chance of remaining intact until the end of the life of the anode, a number of impressions which, taken as a whole, represent a digital coding of the identification number of the anode. The form of and the way these impressions are made are such that even after firing, the code can still be read.

DESCRIPTION OF THE DRAWINGS

FIG. 1 shows very diagrammatically and in vertical section a conventional device for shaping an anode by vibro-compaction;

FIG. 2 shows the same apparatus in plan view with the lid of the mould removed;

FIG. 3 shows an example of anode marking according to the invention using the binary system (A) and a ternary system (B);

FIG. 4 is a vertical section through an embodiment of impression at the time the anode is moulded;

FIG. 5 represents a device for forming marking impressions by drilling of the moulded anode;

FIG. 6 shows a device for simultaneous reading of n impressions by a sensor system;

FIG. 7 shows an embodiment of sequential reading of n impressions, and

FIG. 8 shows complementary marking of the anode rod associated with a given anode which itself carries an individual marking.

The shaping of an anode (1) (often referred to as compaction) is carried out by introducing a predetermined quantity of carbonaceous paste into the mould (2) at a temperature which is generally around 140° C. Compaction may be carried out by various means known to one skilled in the art. In FIGS. 1 and 2 compaction by "vibro-consolidation" is represented in which vibration with a substantially vertical component created by two rotary shafts with an eccentric imbalance, symbolised by (3), in phase opposition, is combined with a consolidation effect by repeated shocks caused by movements of the lid (4) generally referred to as "an impression" which jumps under the action of the vibration and falls back under its own weight (which should be relatively great), for example 2 to 4 tonnes.

Figure 8:
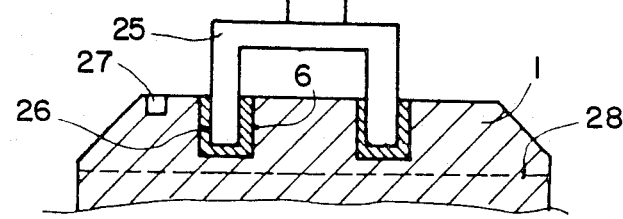

The impression (4) does at the same time provide the structure of the top part of the anode (1) with in particular its cut faces (5) and its plug-holes (6) in which, later on, sealing to the cast iron of the lugs connected to the anode fixing rod will be carried out, as can be seen in FIG. 8.

The mould is disposed on a vibrating table (7) which forms the bottom of the mould. This table is resiliently supported by springs (8). The mould comprises four walls including generally two (transverse walls (9)) which are removable while the other two (side walls (10)) which are fixed.

In the vibro-consolidation position, the two movable walls (9) are rigidly locked and held by mechanical and/or hydraulic means, not shown, because they do not form part of the invention.

After a predetermined period of vibro-consolidation, fixed by experience (and around 1 to 2 minutes), the walls (9) are removed and a jack (11) pushes the moulded anode (1) to the conveyor, for example a roller conveyor (12), towards an intermediate storage area with a view to subsequent furnace firing.

The individual marking of the anodes by the series of impressions which will constitute the digital coding of their identification number may be carried out either during or immediately after vibro-consolidation.

Firstly we will examine the various types of marking impressions which can be used and then the means of providing it, and also the means of reading the markings.

1. Types of impressions

The binary digital marking is certainly the simplest to implement, because it is sufficient to form a hollow or a boss in the anode to code a 1 (for example) and to take the original plane of the marking zone as the level 0. But 8 digits make it possible to codify only 255 positions, which is too few, knowing that a modern series of 240 tanks of 180 KA will consume over 1100 anodes per week. If one wishes furthermore to add a parity bit and one or a number of control bits in order to ensure proper positioning of the anode for the later phases of re-reading and follow the production of anodes over several months, it is necessary to move up to at least 16 bits (65536 values +1 parity bit, in other words 17 marking impressions).

Another solution may reside in a ternary coding such as: depression=0, reference plane=1, boss=2, or any other combination such as: recess of a predetermined depth h=1, recess of depth 2h=2, basic plane (or boss)=0. In this case, 10 marking impressions give $3^{10}=59049$ values, plus an eleventh parity monitoring impression.

These are only examples which do not constitute any limitation of the invention.

Practical making of marking impressions is carried out automatically and without reducing the rate of output of anodes either during the course of compaction or immediately after the compaction of each anode.

2. Marking during the course of compaction

A series of jacks (13), equal in number to the number of marking impressions to be made on the anode (1) during the course of compaction, are fixed either to the cover (4) or to the upper part of the fixed partition (10). A hard steel end piece (14) is fixed to the end of the stem (15) of the jack. Forward movement of the stem (15) can be carried out by translation or, better still, by rotation in the screw-threaded housing (16) which passes through the wall (16) or the cover (4), so ensuring a better and more stable blocking, particularly if one takes into account the amplitude and frequency of the vibrations which are imparted to the mould.

The end piece (14) has, in the case of a binary marking system, at least two stable positions: position A with end piece projecting on the inside of the mould, and position B in which it is flush with the wall of the mould. In the first case, a hollow impression is formed while in the second case, no impression is made into the anode. For a ternary marking, a third position corresponds, for example, to the formation of a recessed impression of twice the depth of the former. It is likewise possible to form relief impressions by providing depression reserves on one of the walls of the mould and under the cover (4).

Figure 1:
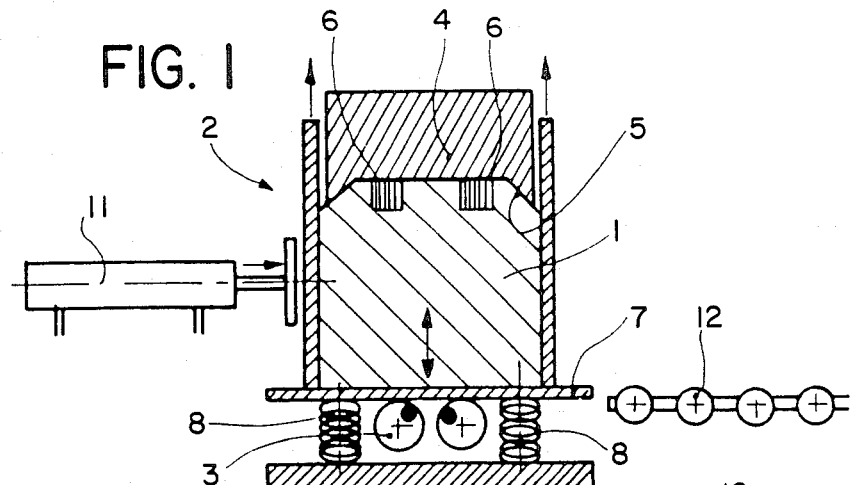
FIGS. 1 to 8 show the way the invention is put into practice.
Figure 2:
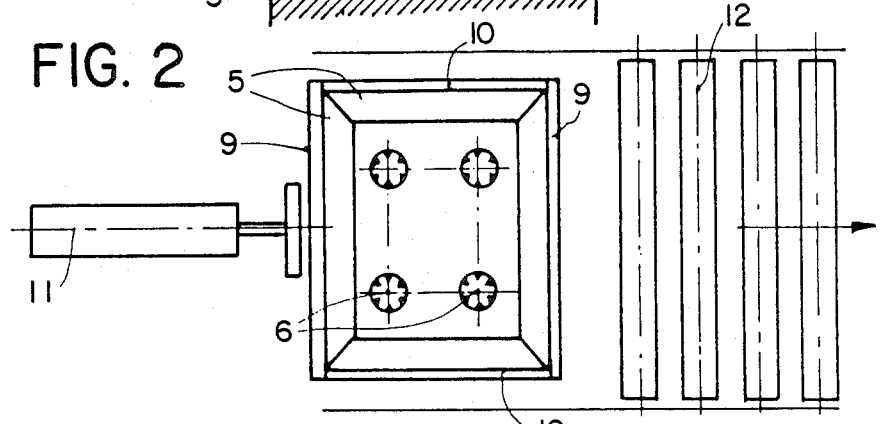
Figure 3A:
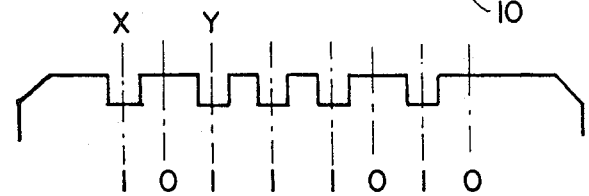
Figure 3B:
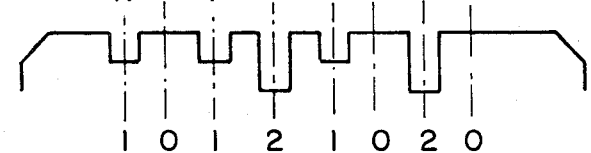
Figure 4:
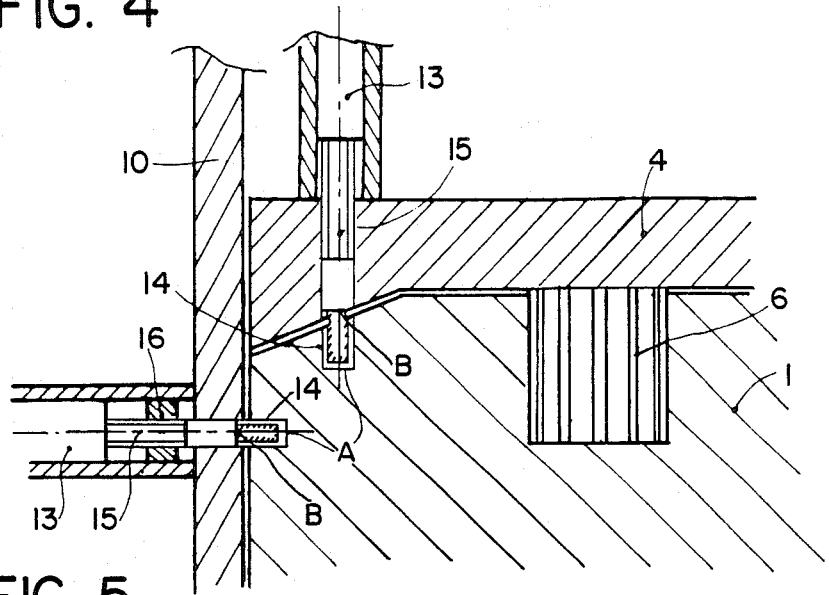

In the various cases, operation of the jacks (whether they are intended for translatory or rotary movement) is carried out by a microprocessor which, on a basis of the decimal number attributed sequentially to each moulded anode, ensures conversion into a binary or ternary or any other system and activates the jacks which form the impressions which go to make up the individual coding of each anode. This code may, for example, include the date, the time and/or a sequential number by which the anode can be identified, plus a reference (X, Y, FIGS. 3A and B) making it possible correctly to position the anode when the re-reading stage comes.

3. Marking after compaction

Another way of forming marking impressions, but this time outside the mould, resides in drilling the various impressions into the moulded anode, which is at a temperature of around 130° to 150° C.

Figure 5:
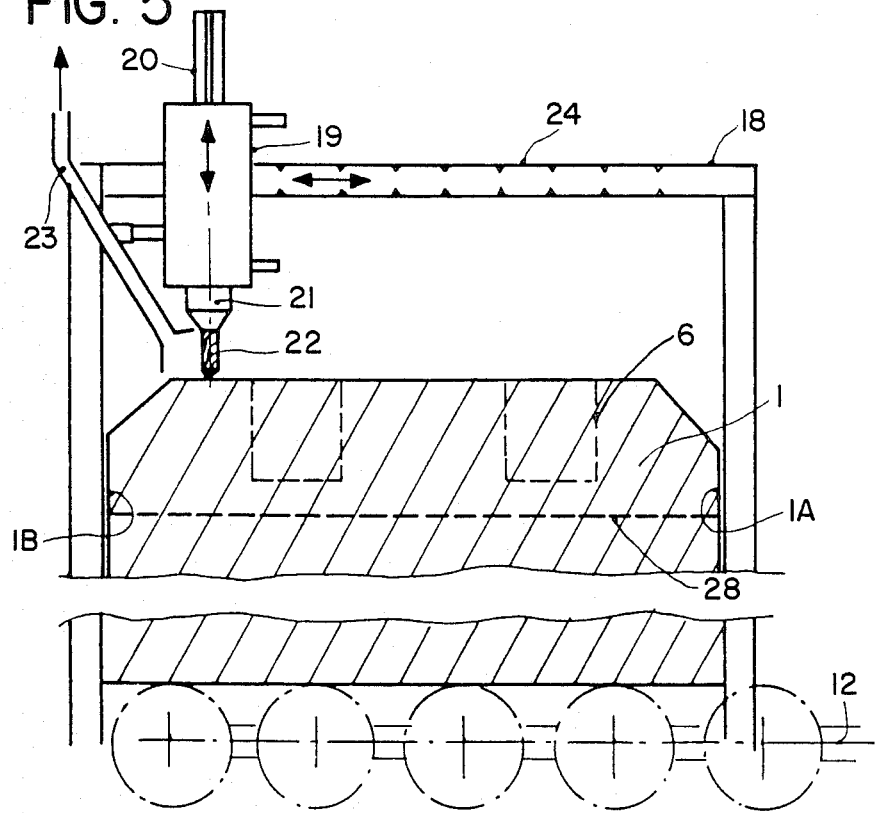

The anode (1), FIG. 5, is firstly immobilised in a predetermined position. A rigid frame (18) supporting a drilling means (19) bears on the two opposite faces (1A, 1B) of the anode in order to fix the working position. The drilling means, supported by the track or rack (20) is able to perform a rising-falling movement. It is fitted with a chuck (21) in which a drilling tool such as a bit or milling cutter is fixed. The tube (23) is connected to means for extracting by vacuum debris of carbonated paste resulting from drilling of the impressions.

The drill (19)+rack (20) assembly also moves longitudinally on the rail (24). The two movements: descent, then upwards movement of the drill (19) to drill a marking impression and then displacement by one step to drill the following impression are conventionally controlled by microprocessor in such a way as to reproduce in digital form the number of the anode assigned by the programme, this number being increased by one digit for each new anode.

A binary coding is provided by a succession of holes and lack of holes, a ternary coding can be made by drilling holes to two different depths and by having an absence of holes (0, 1, 2).

For a greater rate of output, the rail (24) is provided with a number (N) of drills (19) capable of being in number as many as there are impressions to be drilled. Each drill is provided with its own rack (20) and the impressions are drilled simultaneously.

Whatever may be the method or coding used for forming the marking impressions, it is important that these impressions be formed in an area of the anode which will remain intact after it has been extracted from the electrolysis tank and which will constitute the "butt".

In practice, therefore, marking (27) is made in the upper part of the anode, on the tip, on the cut faces (5) or on the top lateral edges, the limit being indicated purely by way of indication by the dotted line (28), FIG. 5.

4. Reading of markings

Figure 6A:
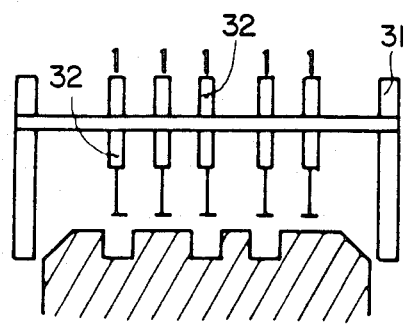
Figure 6B:
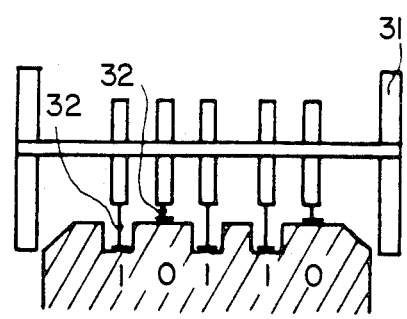
Figure 7:
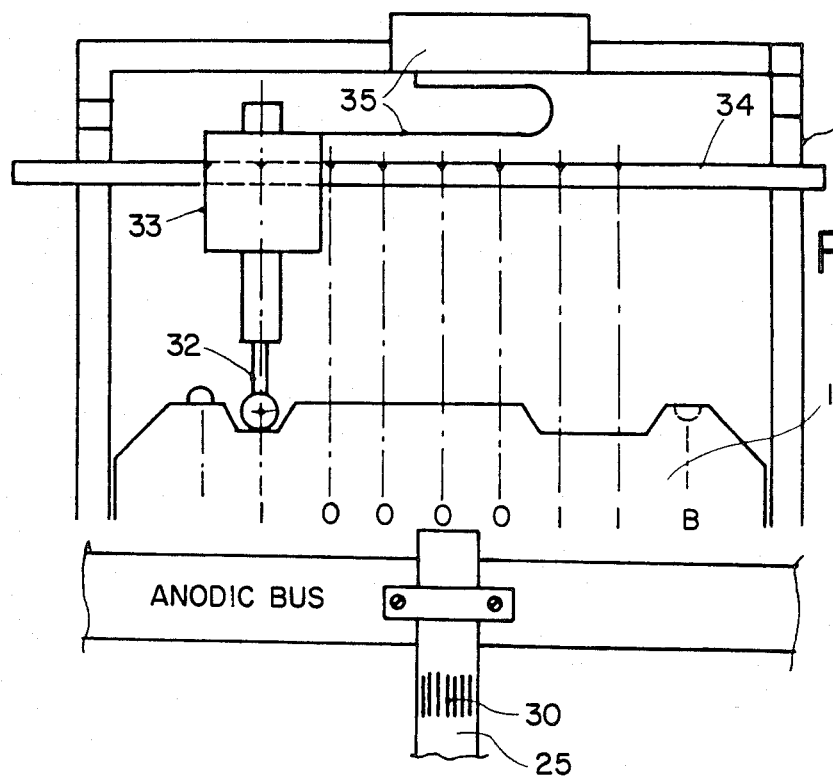

Reading of individual markings of anodes by moulded or drilled impressions is preferably carried out by means of a mechanical sensor such as that which is shown diagrammatically in FIGS. 6 and 7. A rigid frame (31) similar to the support frame (10) of the drilling tool is positioned on two parallel faces of the anode.

In the case of FIG. 6, simultaneous parallel reading of n impressions is carried out by means of n sensors (32) acting either in close contact or in mechanical contact, bearing on the bottoms of the impressions (for a 1) or on the reference plane (for a 0). Where FIG. 7 is concerned, sequential (serial) reading is carried out by the stepwise displacement of the detector (33) along the ruler (34). At each step, the sensor (32) detects the presence or absence of a hollow or a boss. In both cases (FIGS. 6 and 7), movement of the sensor is translated into an electrical magnitude by conventional methods such as a differential transformer or a potentiometric device. The analogue reading is converted to a digital value and then a decimal value and the anode number is directly displayed, for example on a conventional viewing system having seven segments (35).

5. Transference of marking

Once the anode (1) has been sealed on its support rod (25), at (26) it is also possible to transfer the individual number of the anode to the rod, at the top, in an area where the increase in temperature is limited to a maximum of 100°. This double marking constitutes a security measure and also makes it possible to know at any time during electrolysis (where marking of the anode proper is not actually accessible), what number anode shows up some anomaly or any interesting phenomenon. This marking (30) can be carried out by ordinary ink or paint which is capable of resisting the working temperature and environmental conditions, taking for instance the form of a bar code or any other visibly readable analogue code.

The code (30) marked on the anode rod (25) must, of course, be effaced before the rod is used again on a fresh anode.

The device for reading digital markings (27) may be combined with the system for reading the code (30) marked on the anode rod (25) in order to trigger an alarm if there is discord between the two readings.

ADVANTAGES PROVIDED BY THE INVENTION

This is a method which makes it possible individually, systematically and by completely automatic means to supervise the entire cycle of an anode from the time it emerges from the compaction unit until the time the butts return to the sealing shop.

(A) Advantages of individual monitoring of anodes

1. Possibility of referring products to the various key points in the plant:
   crude production (compaction of the paste)
   storing of the crude anodes
   furnace charging
   test bed (measurements, coring)
   storing of cooked anodes
   sealing of support rods
   storing of sealed anodes
   placing on the electrolysis tank
   removing the butt from the used anode
   treating the butt (recovery of elements: carbon, electrolyte, cast iron, metal rods).

2. Improvement in quality

By determining correlative factors peculiar to each plant among the characteristics of the anodes on the one hand and the characteristics of manufacture: raw materials (coke and tar), regulation of the production cycle (blending of carbonaceous paste, compaction, cooking), it is possible to determine the influence of those varous factors and to have them regulated in such a way as to optimise the characteristics of the anodes.

Likewise, by correlation among the characteristic features of the anodes and their behaviour during electrolysis, it is possible to optimise specific energy consumption (kWh/tonne of aluminium produced), reducing incidents due to the failure of anodes, improve the performances of electrolysis.

(B) Advantage of marking of anodes

To carry out this individual monitoring, there are two ways:
  a "logical" method which resides in administering all successive handling stages which an anode can undergo, the work being done by a centralised system
  a "material" method which resides in marking each of the anodes when it is made and then, whenever necessary, re-reading this information on the anode.

The advantage of the "material" method (marking according to the invention) resides in that it overcomes completely any question of disturbances likely to affect the circuit of an anode (parasitic manual handling, manual rejection, errors ... ). Indeed, the invention creates a reference physically present on the anode and which remains indelible throughout its life.

(C) Advantage of marking by impression+marking of the rods
  it is not expensive (readers are not highly sophisticated and are identical
  no foreign body is introduced in the anode. It is therefore "transparent" in relation to the process
  it is legible at all stages in the process.

APPLICATIONS OF THE INVENTION

Although the invention has been described in the particular case of the marking of carbonaceous anodes intended for the production of aluminium by electrolysis, it is obvious that it can be applied to any product which is shaped and of which the production and application stages comprise multiple operations and where individual progress is to be monitored. This is the case particularly with refractory blocks intended for the assembly of industrial furnaces (various bricks and shaped parts), based on carbonaceous products (carbon and carbides) and/or oxidised mineral compounds (refractory oxides), or other refractory mineral compounds such as borides, nitrides, oxynitrides, etc.

In the same way, the invention can be applied to the marking of other types of carbonaceous products such as precooked electrodes, for electrometallurgy.

What is claimed is:

1. Method for individually marking precooked anodes used in the production of aluminum by electrolysis in the Hall-Heroult process, said anodes shaped by hot compaction of a carbonaceous paste, comprising, during or immediately after said compaction, forming in the upper part of each of said anodes, on an exposed face thereof, a plurality of recessed, relief, or recessed and relief impressions, said impressions constituting a digital coding of a number by which each of said anodes can be identified, said impressions being legible and exposed at the time of withdrawal of the components of the butt of the anode in worn condition from the electrolysis tank.

2. A marking method according to claim 1, wherein said marking is carried out in binary code, the reference plane of the zone of the anode which carries the marking corresponding to a binary digit (0 or 1), while a cavity or relief boss corresponds to the other binary digit.

3. A marking method according to claim 1, wherein said marking is carried out using ternary code, a first ternary digit (0, 1 or 2) being represented by the reference plane in the zone of the anode which carries the marking, a second ternary digit being represented by a depression of depth h and a third ternary digit being represented by a depression of depth substantially greater than h.

4. A marking method according to claim 3, wherein said depth substantially greater than h is about 2 h.

5. A marking method according to claim 1, wherein said marking is carried out using ternary code, and wherein one ternary digit is represented by a boss standing out in relief above the reference plane.

6. A marking method according to claim 1, additionally comprising forming at least one impression representing a parity monitoring digit.

7. A marking method according to claim 1, additionally comprising forming at least one impression representing a digit for monitoring the positioning of the anode during the final phases of the reading of the marking.

8. A marking method according to claim 1, additionally comprising the step of marking a suspension rod for each of said anodes with the number marked on a corresponding anode.

9. A marking method according to claim 8, wherein said suspension rods are marked with a bar code which can be read visually.

10. A marking method according to claim 1, 2, 3 or 4, wherein said impressions are formed at the time the anode is compacted.

11. A marking method according to claim 1, 2, 3 or 4, wherein said impressions are formed immediately after compaction by drilling of the compacted anodes.

12. A marking method according to claim 1, 2, 3 or 4, additionally comprising the step of reading said markings utilizing a number of sensors equal to the number of impressions on each of said anodes, and wherein each of the impressions on an anode is read simultaneously in parallel.

13. A marking method according to claim 1, 2, 3 or 4, additionally comprising the step of reading said markings utilizing a single sensor passing over each of the impressions on an anode successively in series.

14. A marking method according to claim 7, additionally comprising the steps of reading the marking on an anode, reading the marking on an accompanying suspension rod, comparing the readings, and triggering an alarm if said readings do not agree.

15. A marked, precooked anode for the production of aluminum by electrolysis in the Hall-Heroult process, said marked anode comprising in its upper portion, on an exposed face thereof, a plurality of recessed, relief, or recessed and relief impressions, said plurality of impressions constituting a digital coding of a number by which each of said anodes can be identified, said plurality of impressions being legible and exposed after use of said anodes.

16. A marked, precooked anode according to claim 15, wherein said impressions are in binary code, the reference plane of the zone of the anode which carries the marking corresponding to a binary digit (0 or 1), and a cavity or relief boss corresponding to the other binary digit.

17. A marked, precooked anode according to claim 15, wherein said impressions are made in ternary code, a first ternary figure (0, 1 or 2) being represented by the reference plane in the zone of the anode which carries the marking, and a second ternary digit being represented by a depression of depth h.

18. A marked, precooked anode according to claim 17, wherein a third ternary digit is represented by a depression of depth substantially greater than h.

19. A marked, precooked anode according to claim 17, wherein a third ternary digit is represented by a boss standing out in relief above the reference plane.

* * * * *